United States Patent
Kozuka

(10) Patent No.: US 10,763,524 B2
(45) Date of Patent: Sep. 1, 2020

(54) FUEL CELL MODULE

(71) Applicant: TOYOTA JIDOSHA KABUSHIKI KAISHA, Toyota-shi, Aichi-ken (JP)

(72) Inventor: Tomoyuki Kozuka, Nagoya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 184 days.

(21) Appl. No.: 16/002,158

(22) Filed: Jun. 7, 2018

(65) Prior Publication Data

US 2019/0013531 A1 Jan. 10, 2019

(30) Foreign Application Priority Data

Jul. 6, 2017 (JP) .................................. 2017-132578

(51) Int. Cl.
| | |
|---|---|
| *H01M 8/04* | (2016.01) |
| *H01M 8/08* | (2016.01) |
| *H01M 8/12* | (2016.01) |
| *H01M 8/04089* | (2016.01) |
| *H01M 8/04007* | (2016.01) |
| *H01M 8/04119* | (2016.01) |
| *H01M 8/04029* | (2016.01) |
| *H01M 8/04223* | (2016.01) |

(52) U.S. Cl.
CPC ... *H01M 8/04097* (2013.01); *H01M 8/04029* (2013.01); *H01M 8/04067* (2013.01); *H01M 8/04164* (2013.01); *H01M 8/04253* (2013.01); *H01M 2250/20* (2013.01)

(58) Field of Classification Search
CPC ............... H01M 8/04; H01M 8/04089; H01M 8/04229; H01M 8/04007
See application file for complete search history.

(56) References Cited

U.S. PATENT DOCUMENTS

| | | | | | |
|---|---|---|---|---|---|
| 5,012,640 | A | * | 5/1991 | Mirville | .................. F02C 3/073 |
| | | | | | 415/110 |
| 2004/0038094 | A1* | | 2/2004 | Klenk | ............... H01M 8/04007 |
| | | | | | 429/410 |

(Continued)

FOREIGN PATENT DOCUMENTS

| | | |
|---|---|---|
| JP | 2008-66087 A | 3/2008 |
| JP | 2014-123457 A | 7/2014 |
| JP | 2015-231319 A | 12/2015 |

*Primary Examiner* — Kenneth J Douyette
(74) *Attorney, Agent, or Firm* — Dickinson Wright PLLC

(57) ABSTRACT

A fuel cell module comprises a hydrogen pump including a pump side facing surface having a pump side opening, a gas-liquid separator including a separator side facing surface having a separator side opening, three or more fastening points at which the hydrogen pump and the gas-liquid separator are fastened to each other, a heating flow path, a gasket that seals a connection portion, at which the pump side opening and the separator side opening are connected to each other, and an inclination preventing portion formed by an elastic member. At least a part of the gasket is disposed outside an area defined by lines connecting the three or more fastening points to each other, and between the pump side facing surface and the separator side facing surface, and the inclination preventing portion is disposed within the area, and between the pump side facing surface and the separator side facing surface.

4 Claims, 11 Drawing Sheets

(56) References Cited

U.S. PATENT DOCUMENTS

| | | | |
|---|---|---|---|
| 2008/0063912 A1* | 3/2008 | Bronold | H01M 8/04007 |
| | | | 429/410 |
| 2010/0183939 A1 | 7/2010 | Sekine et al. | |
| 2013/0017470 A1* | 1/2013 | Hotta | H01M 8/04029 |
| | | | 429/458 |
| 2017/0096172 A1 | 4/2017 | Nagaosa | |

* cited by examiner

FUEL CELL MODULE

CROSS-REFERENCE TO RELATED APPLICATION

The present application claims priority to Japanese Patent Application No. 2017-132578, filed Jul. 6, 2017, the contents of which are incorporated herein by reference in their entirety.

BACKGROUND

Field

The present disclosure relates to a fuel cell module.

Related Art

Fuel cell vehicles with a fuel cell stack installed in a front room on a front side of the vehicle have been known (see, for example, JP2015-231319A).

The fuel cell vehicle having the fuel cell stack installed in the front room may have a hydrogen pump and a gas-liquid separator further installed in the front room. The hydrogen pump resupplies hydrogen off gas, discharged from the fuel cell stack, to the fuel cell stack. The gas-liquid separator separates water from the hydrogen off gas. A heating flow path may be arranged near the gas-liquid separator. A fluid for heating the hydrogen pump and the gas-liquid separator flows in the heating flow path to prevent liquid water in the gas-liquid separator from freezing in a low temperature environment.

In this configuration, the hydrogen pump and the gas-liquid separator are preferably directly fastened and connected to each other with a hydrogen flow path formed therebetween, instead of additionally providing a separate member for forming the hydrogen flow path between the hydrogen pump and the gas-liquid separator, so that the fuel cell module including the hydrogen pump and the gas-liquid separator can be downsized. A gasket may be provided to seal a connection portion between the hydrogen pump and the gas-liquid separator directly connected to each other with the flow path formed therebetween. Unfortunately, a plurality of fastening points might not be arrangeable to surround the connection portion between the hydrogen pump and the gas-liquid separator and to surround the gasket, depending on a position of the heating flow path. As a result, reaction produced at the fastening points due to repulsive force of the gasket might be uneven. When the reaction produced at the fastening points is uneven, a facing surface of the gas-liquid separator might be inclined relative to a facing surface of the hydrogen pump. Thus, a technique ensuring a lower risk of reaction produced at the fastening points, due to repulsive force of the gasket, being uneven has been called for.

SUMMARY

In an aspect of the present disclosure, there is provided a fuel cell module. The fuel cell module comprises: a hydrogen pump that circulates hydrogen offgas in a fuel cell stack and includes a pump side facing surface having a pump side opening through which the hydrogen offgas flows; a gas-liquid separator that is fastened to the hydrogen pump, separates water from the hydrogen gas, and includes a separator side facing surface having a separator side opening through which the hydrogen offgas flows; three or more fastening points at which the hydrogen pump and the gas-liquid separator are fastened to each other with the pump side facing surface and the separator side facing surface facing each other; a heating flow path in which a fluid flows to heat the hydrogen pump and the gas-liquid separator; a gasket that seals a connection portion, at which the pump side opening and the separator side opening are connected to each other, in a flow path through which the hydrogen offgas flows; and an inclination preventing portion formed by an elastic member. At least a part of the gasket is disposed outside an area defined by lines connecting the three or more fastening points to each other, and between the pump side facing surface and the separator side facing surface, and the inclination preventing portion is disposed within the area, and between the pump side facing surface and the separator side facing surface.

DETAILED DESCRIPTION

A. First embodiment

Figure 1:
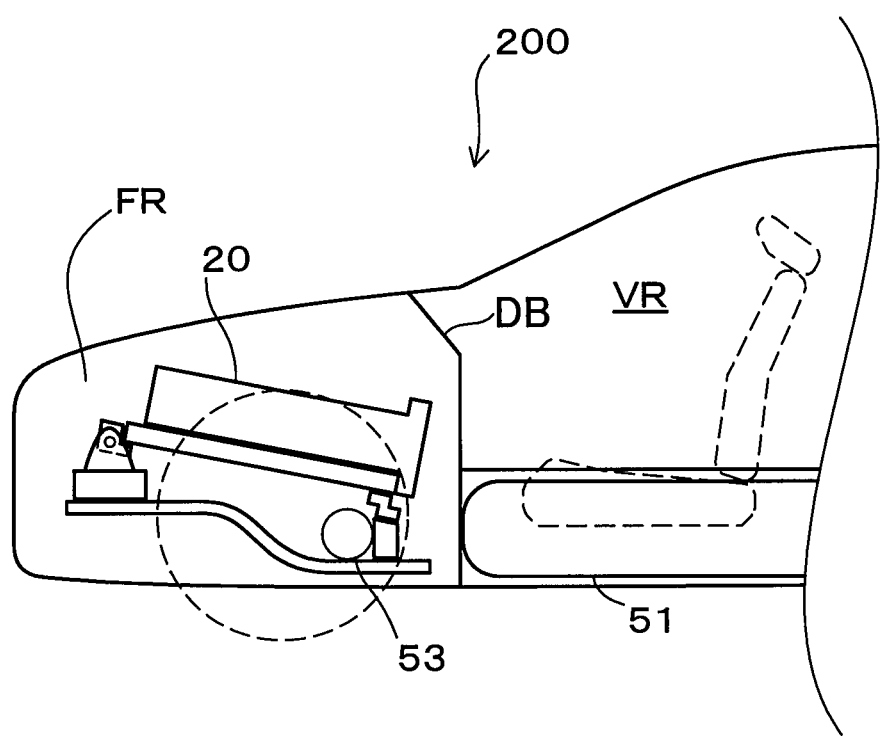
FIG. 1 is a diagram illustrating a schematic configuration of a fuel cell vehicle including a fuel cell module according to a first embodiment.
Figure 2:
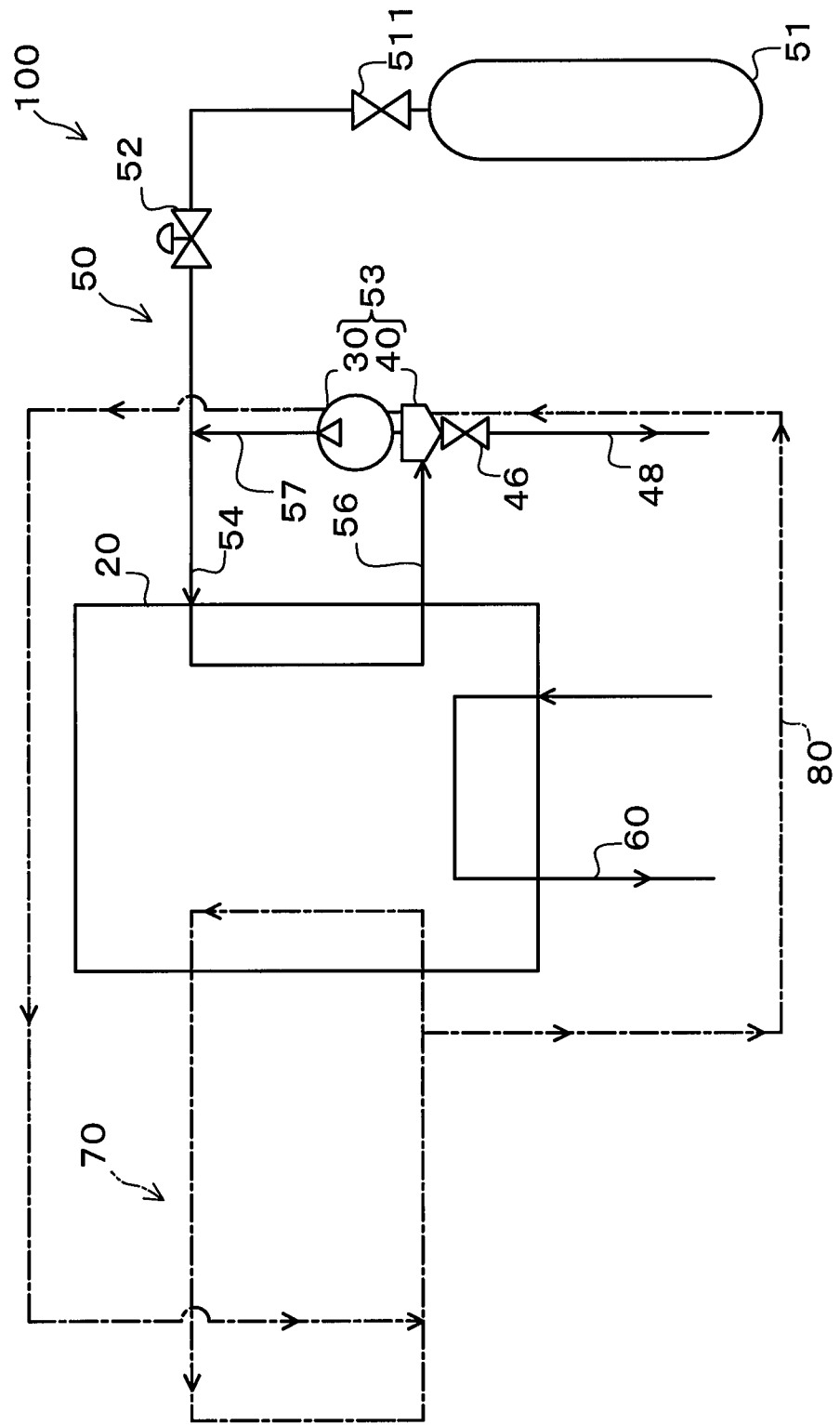
FIG. 2 is a diagram illustrating a configuration of a fuel cell system including the fuel cell module according to the first embodiment.

FIG. 1 is a diagram illustrating a schematic configuration of a fuel cell vehicle including a fuel cell module 53 according to a first embodiment. FIG. 2 is a diagram illustrating a configuration of a fuel cell system 100 including the fuel cell module 53 according to the first embodiment. A fuel cell vehicle 200 is a vehicle that travels with a fuel cell stack 20 serving as a power source. The fuel cell stack 20 according to the present embodiment is formed by a polymer electrolyte fuel cell. The fuel cell module 53, provided with various accessories that supply hydrogen and air to the fuel cell stack 20, includes a hydrogen pump 30 and a gas-liquid separator 40.

In the fuel cell vehicle 200 (FIG. 1), the fuel cell module 53 is provided on the lower side of the fuel cell stack 20 in a gravity direction (the lower side in the paper sheet), so that water as a result of separation by the gas-liquid separator 40 can be efficiently discharged. This arrangement enables a hydrogen supply/discharge mechanism 50, provided with the fuel cell module 53, to be formed with a short flow path. If such a flow path is long, supply of hydrogen gas might involve pressure loss. The hydrogen pump 30 and the gas-liquid separator 40 are disposed near a dashboard DB defining a vehicle rear end side of a front room FR. The fuel cell module 53 thus disposed near the dashboard DB can be connected to a supply flow path 54, connecting the fuel cell stack 20 and a hydrogen tank 51 to each other, through a short pipe. The front room FR is positioned more on the front side than a cabin VR.

The fuel cell system 100 (FIG. 2) is installed in the fuel cell vehicle 200. The fuel cell system 100 generates power through chemical reaction between anode gas and cathode gas. In the present embodiment, the anode gas is hydrogen gas and the cathode gas is air. The fuel cell system 100 includes the fuel cell stack 20, the hydrogen supply/discharge mechanism 50, an air supply/discharge mechanism 60, a coolant circulation mechanism 70, and a heating flow path 80.

The hydrogen supply/discharge mechanism 50 is in charge of supplying the hydrogen gas to the fuel cell stack 20 and circulating hydrogen offgas. The hydrogen supply/discharge mechanism 50 includes a hydrogen tank 51, a regulator 52, a fuel cell module 53, a supply flow path 54, an inflow pipe 56, and an outflow pipe 57.

The hydrogen tank 51 stores therein the hydrogen gas. The hydrogen gas stored in the hydrogen tank 51 is supplied to the fuel cell stack 20 through the supply flow path 54. A shutoff valve 511 is provided at a connection portion at which the hydrogen tank 51 is connected to the supply flow path 54. The shutoff valve 511 is for switching between states where the hydrogen tank 51 and the supply flow path 54 are in communication and not in communication, so that supply of hydrogen gas from the hydrogen tank 51 to the fuel cell stack 20 is enabled and disabled. The amount of the hydrogen gas supplied to the fuel cell stack 20 is adjusted through pressure adjustment using the regulator 52 and injection from an injector (not illustrated).

The inflow pipe 56 is a pipe that connects the fuel cell module 53 to an outlet of the fuel cell stack 20 for the hydrogen offgas. The outflow pipe 57 is a pipe that connects the fuel cell module 53 to the supply flow path 54.

The fuel cell module 53 includes the hydrogen pump 30, the gas-liquid separator 40, and an air/water discharge valve 46. The fuel cell module 53 resupplies the hydrogen offgas, flowed in from the inflow pipe 56, to the fuel cell stack 20. The hydrogen offgas includes produced water to be separated by the gas-liquid separator 40. The hydrogen offgas, from which the produced water has been separated, is sent to the outflow pipe 57 by the hydrogen pump 30. The hydrogen offgas sent to the outflow pipe 57 is resupplied to the fuel cell stack 20 through the supply flow path 54 together with the hydrogen gas supplied from the hydrogen tank 51. The produced water that has been separated is discharged through an air/water discharge portion 48 together with the hydrogen offgas, while the air/water discharge valve 46 is open.

The air supply/discharge mechanism 60 is in charge of supplying air to the fuel cell stack 20 and discharging air from the fuel cell stack 20.

The coolant circulation mechanism 70 circulates a coolant for controlling an operation temperature of the fuel cell stack 20. Examples of the coolant include air, water, and nonfreezing water such as ethylene glycol. In the present embodiment, the coolant is water. The water used as the coolant is hereinafter also referred to as cooling water.

The heating flow path 80 is a flow path through which a fluid for heating the fuel cell module 53 flows. Examples of this fluid for heating include air, water, and nonfreezing water such as ethylene glycol. In the present embodiment, the fluid for heating is water used as the cooling water. The heating flow path 80 is connected in series with a flow path of the coolant circulation mechanism 70. The water used for heating is hereinafter also referred to as heating water. The heating flow path 80, connected in series with the flow path of the coolant circulation mechanism 70 in the present embodiment, may be provided independently from the coolant circulation mechanism 70 if the fluid for heating is a fluid other than the cooling water.

The temperature of the heating water is adjusted so that the produced water can be prevented from freezing in the fuel cell module 53. In the present embodiment, the temperature of the heating water is adjusted with an air conditioning system (not illustrated) of the fuel cell vehicle 200. Specifically, the temperature of the heating water is adjusted with an electric heater used in the air conditioning system.

The heating flow path 80 used for heating the fuel cell module 53 in the present embodiment can also be used for regulating the heat produced by the fuel cell module 53. The fuel cell module 53 can be cooled with water at a temperature lower than that of the fuel cell module 53 flowing in the heating flow path 80.

Figure 3:
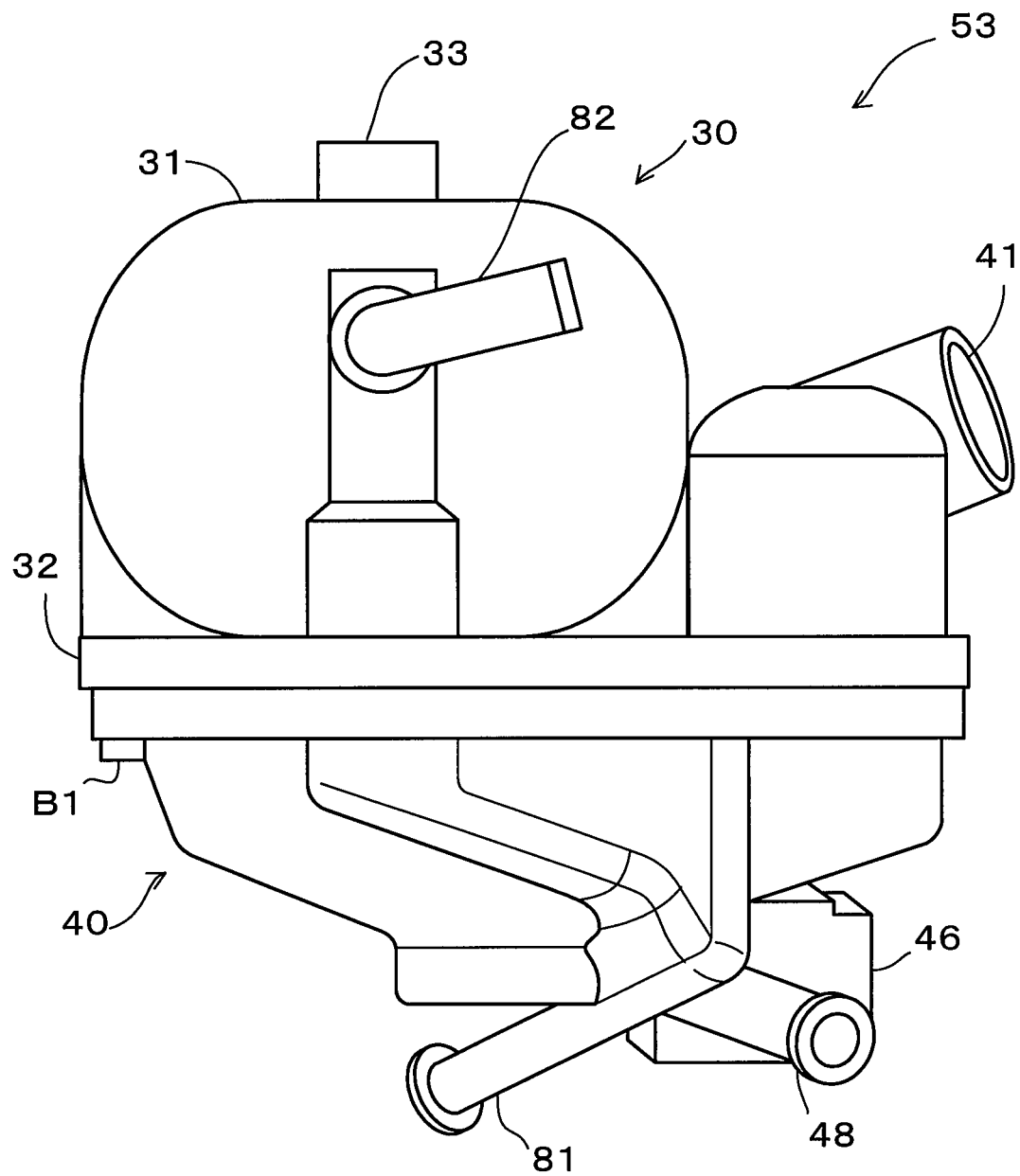
FIG. 3 is a schematic view of the fuel cell module.

FIG. 3 is a schematic view of the fuel cell module 53. The fuel cell module 53 has the hydrogen pump 30 and the gas-liquid separator 40 directly connected to each other, so that no pipe through which the hydrogen offgas flows needs to be separately provided between the hydrogen pump 30 and the gas-liquid separator 40. The hydrogen pump 30 includes a sending portion 33 for sending the hydrogen offgas to the outflow pipe 57 (FIG. 2). The fuel cell module 53, including the hydrogen pump 30 and the gas-liquid separator 40, further includes a pump side pipe 82 and a separator side pipe 81 each serving as apart of the heating flow path 80. In the present embodiment, the heating water flows through the separator side pipe 81 and then flows into the pump side pipe 82. The hydrogen pump 30 and the gas-liquid separator 40 are attached to each other by being fastened to each other with bolts at a plurality of fastening points (only a first fastening point B1 is illustrated in FIG. 3).

The gas-liquid separator 40 is positioned on the lower side of the hydrogen pump 30 in the gravity direction (the lower side in the paper sheet of FIG. 3) in the front room FR of the fuel cell vehicle 200. The gas-liquid separator 40 includes an inlet 41 connected to the inflow pipe 56 (FIG. 2), the air/water discharge valve 46, and the air/water discharge portion 48 provided with the air/water discharge valve 46. The gas-liquid separator 40 separates water (liquid water) included in the hydrogen offgas. The produced water separated by the gas-liquid separator 40 is discharged from the air/water discharge portion 48, provided on the lower side of the gas-liquid separator 40, together with the hydrogen offgas.

The hydrogen offgas that has flowed into the gas-liquid separator 40 through the inlet 41 flows into the hydrogen pump 30, and then is sent out from the sending portion 33.

The pump side pipe 82 is arranged in such a manner that a main body 31, accommodating blades (described later) of the hydrogen pump 30, can be heated with the heating water flowing in the pump side pipe 82. Specifically, the pump side pipe 82 has an outer surface in contact with an outer surface of a casing of the main body 31.

The separator side pipe 81 is arranged in such a manner that the gas-liquid separator 40 can be heated with the heating water flowing in the separator side pipe 81. Specifically, the separator side pipe 81 has an outer surface in contact with an outer surface of the gas-liquid separator 40. The separator side pipe 81 is preferably provided to heat a portion near the position where the air/water discharge valve 46 of the air/water discharge portion 48 is provided. This configuration ensures a lower risk of the produced water freezing to close the air/water discharge portion 48.

Figure 4:
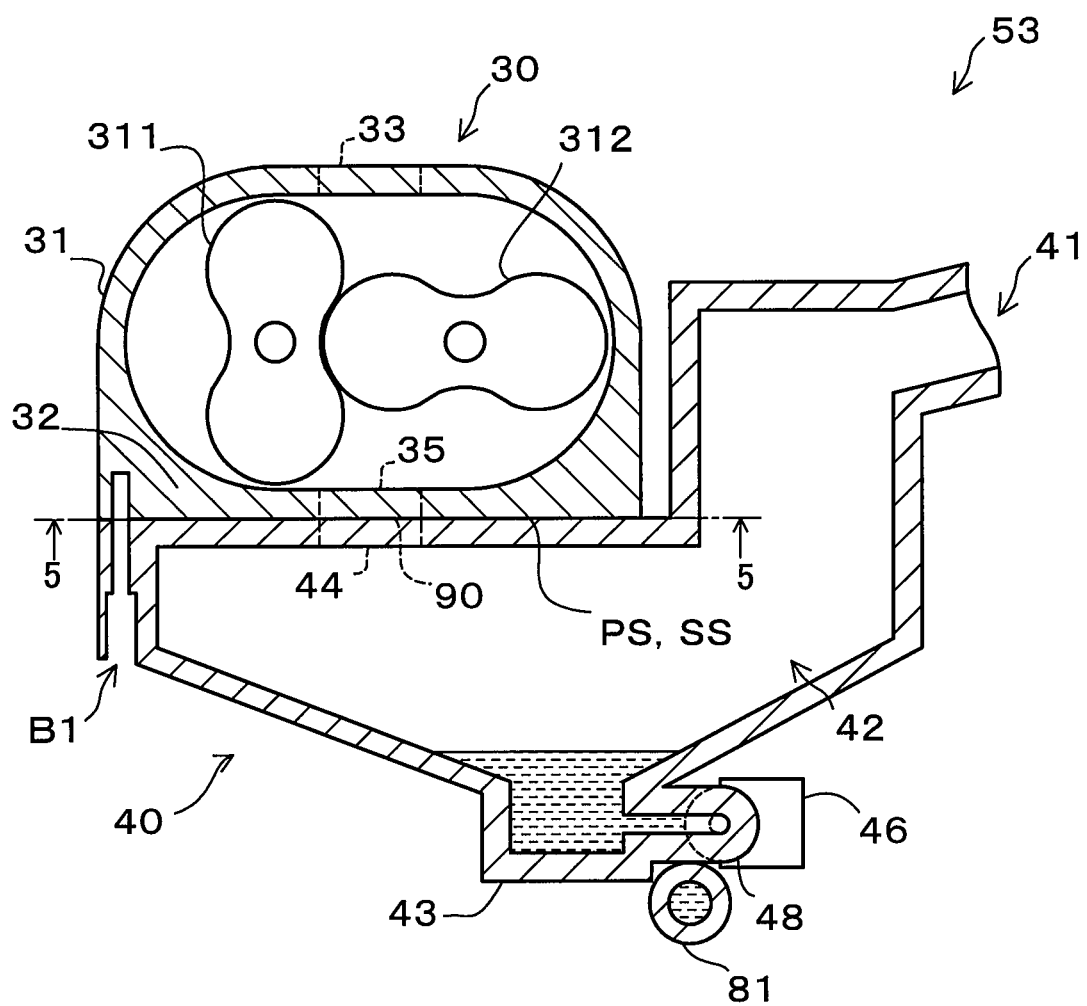
FIG. 4 is a schematic cross-sectional view of the fuel cell module in FIG. 3, taken along a predetermined plane along the paper sheet.

FIG. 4 is a schematic cross-sectional view of the fuel cell module 53 in FIG. 3, taken along a predetermined plane along the paper sheet. Functions of the hydrogen pump 30 and the gas-liquid separator 40 are described below with reference to FIG. 4. A hatched portion represents the water stored in the gas-liquid separator 40. A portion of the outer surface of the hydrogen pump 30 that faces the gas-liquid separator 40 in a state where the hydrogen pump 30 and the gas-liquid separator 40 are fastened to each other is referred to as a pump side facing surface PS. A portion of the outer surface of the gas-liquid separator 40 that faces the pump side facing surface PS in the state where the hydrogen pump 30 and the gas-liquid separator 40 are fastened to each other is referred to as a separator side facing surface SS.

The gas-liquid separator 40 includes the inlet 41, a separation portion 42, a storage portion 43, a separator side opening 44, the air/water discharge valve 46, and the air/water discharge portion 48. The inlet 41 is an opening through which the hydrogen offgas flows into the separation portion 42 from the inflow pipe 56. The separation portion 42 is an inner space of the gas-liquid separator 40 where the hydrogen offgas that has flowed in from the inlet 41 is separated into water and hydrogen offgas separated from the water. The storage portion 43 is positioned on the lower side of the separation portion 42 (the lower side in the paper sheet of FIG. 4), and temporarily stores therein the water thus separated. The water included in the hydrogen offgas moves from the separation portion 42 to the storage portion 43 due to the gravity, to be separated from the hydrogen offgas. The separator side opening 44 is an opening connected to a pump side opening 35 to form a part of the hydrogen flow path. The hydrogen offgas separated from water moves into the hydrogen pump 30 through the separator side opening 44 and the pump side opening 35 described later. The air/water discharge portion 48 is a pipe connected to the storage portion 43 and forms a flow path communicating the inside and the outside of the gas-liquid separator 40 with each other. The air/water discharge valve 46 is an on-off valve (a solenoid valve, for example) interposed between the storage portion 43 and the air/water discharge portion 48. The air/water discharge valve 46 switches the storage portion 43 and the air/water discharge portion 48 from a communicated state to a non-communicated state or from the non-communicated state to the communicated state. When the storage portion 43 and the air/water discharge portion 48 are switched to the communicated state, water stored in the storage portion 43 is discharged to the outside together with the hydrogen offgas. For example, the non-communicated state is switched to the communicated state, with the air/water discharge valve 46, when the amount of water in the storage portion 43 exceeds a predetermined amount or when the concentration of nitrogen included in the hydrogen offgas exceeds a predetermined concentration.

The hydrogen pump 30 includes the main body 31, a bottom wall 32, the pump side opening 35, the sending portion 33, and blades 311 and 312. The hydrogen pump 30 is a two-stage roots pump having the main body 31 accommodating the two blades 311 and 312. The main body 31 is a casing accommodating the blades 311 and 312. When the two blades 311 and 312 rotate in the main body 31, the hydrogen offgas is sent from the side of the pump side opening 35 toward the side of the sending portion 33. The bottom wall 32 is a wall positioned on the lower side of the main body 31, and has the outer surface serving as the pump side facing surface PS. The pump side opening 35 is an opening formed through the bottom wall 32 between the pump side facing surface PS and an inner surface opposite to the pump side facing surface PS. The pump side opening 35 is connected to the separator side opening 44 to be a part of the hydrogen flow path. The hydrogen offgas flows into the hydrogen pump 30 from the gas-liquid separator 40 through the pump side opening 35. The sending portion 33 is an opening through which the hydrogen offgas, flowed into the hydrogen pump 30 from the gas-liquid separator 40, is sent to the outflow pipe 57. A portion where the pump side opening 35 and the separator side opening 44 are connected to each other is also referred to as a connection portion 90.

The separator side pipe 81 is positioned to be capable of heating the air/water discharge valve 46 of the gas-liquid separator 40, whereby the air/water discharge portion 48 can be prevented from closing due to the air/water discharge valve 46 freezing. When the air/water discharge portion 48 is closed, the water in the gas-liquid separator 40 might fail to be discharged and thus the water might fail to be sufficiently separated from the hydrogen offgas. When the water fails to be sufficiently separated from the hydrogen offgas, power generation efficiency might be compromised due to the hydrogen offgas including water supplied to the fuel cell stack 20.

Figure 5:
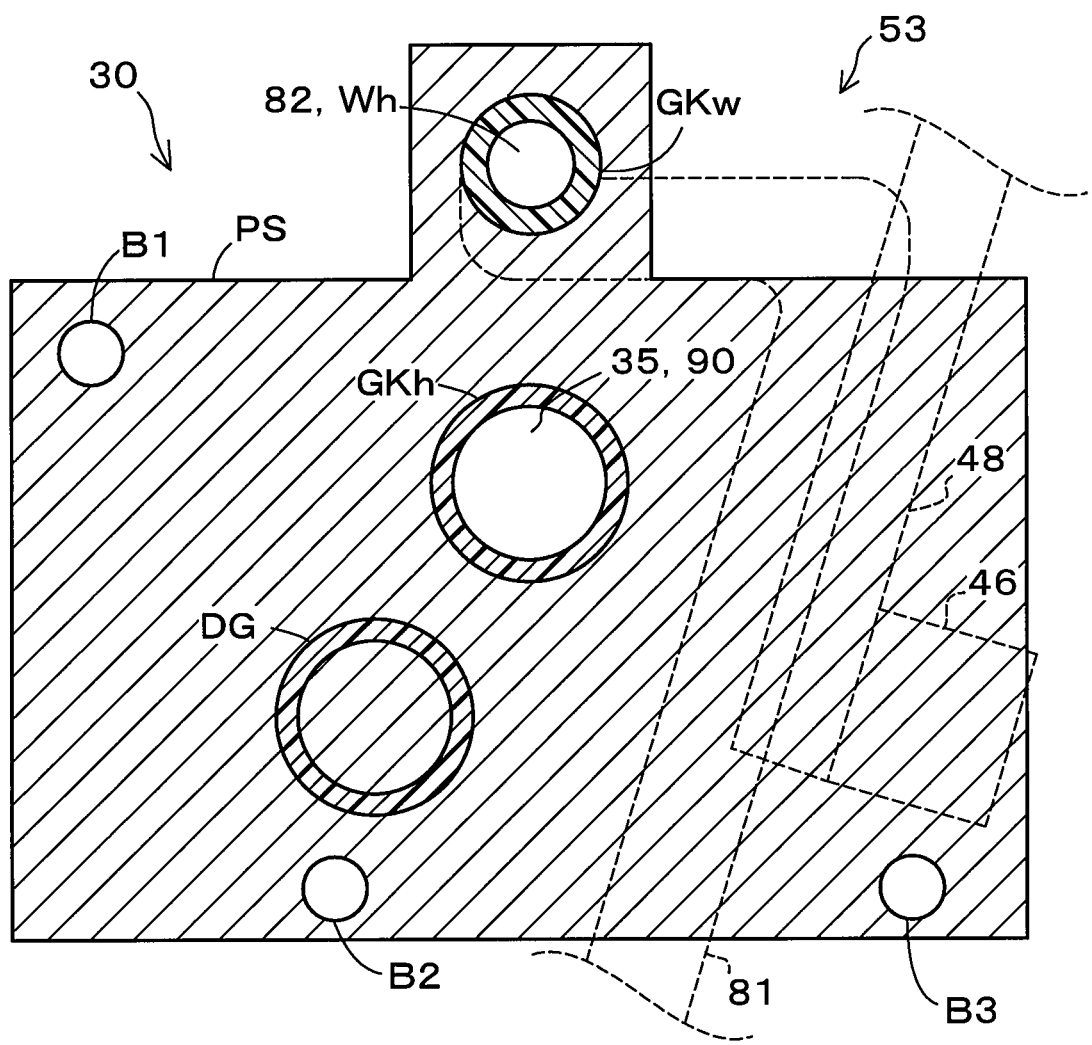
FIG. 5 is a cross-sectional view taken along line 5-5 in FIG. 4.

FIG. 5 is a cross-sectional view taken along line 5-5 in FIG. 4. Areas defined by dotted lines in FIG. 5 indicate positions of the separator side pipe 81, the air/water discharge valve 46, and the air/water discharge portion 48. The positional relationship among a gasket GKh, an inclination preventing portion DG, and fastening points B1 to B3 on the pump side facing surface PS in the fuel cell module 53 is described below.

The pump side facing surface PS includes an opening Wh for forming the pump side pipe 82, the pump side opening 35, and the three fastening points B1 to B3 that are bolt holes for fastening the hydrogen pump 30 and the gas-liquid separator 40 to each other. A gasket GKw is provided on the outer circumference of the opening Wh. The gasket GKw is a sealing member made of rubber or the like, and ensures sealing to prevent water in the heating flow path 80 from leaking. A groove (not illustrated) that receives the gasket GKh is provided on the periphery of the pump side opening 35.

The gasket GKh is a hydrogen-impermeable sealing member. The gasket GKh may be made of rubber having sealing property. The gasket GKh is arranged to surround the circumference of the connection portion 90 between the pump side opening 35 and the separator side opening 44, while being compressed and deformed. The gasket GKh ensures sealing to prevent the hydrogen offgas from leaking from the connection portion 90. In the present embodiment, the gasket GKh is fixed in place by means of resin-based or other type of adhesive and surface pressure, from the pump side facing surface PS and the separator side facing surface SS, achieved with the fastening using bolts at the fastening points B1 to B3.

The inclination preventing portion DG is an elastic member that is compressed and deformed by pressure from the pump side facing surface PS and the separator side facing surface SS to reduce unevenness of reaction produced at the fastening points B1 to B3 due to repulsive force of the gasket GKh. With this configuration, the inclination preventing portion DG prevents the pump side facing surface PS from inclining relative to the separator side facing surface SS. Examples of the elastic member serving as the inclination preventing portion DG include a spring, such as a compression coil spring and a leaf spring, and rubber such as synthetic rubber. The elastic member used for the inclination preventing portion DG preferably has approximately the same level of compressibility as the member of the gasket GKh, and is more preferably the same member (that is, a gasket) as the gasket GKh. The inclination preventing portion DG and the gasket GKh having approximately the same level of compressibility can have the volumes changing by approximately the same amount due to pressure involved in fastening the hydrogen pump 30 and the gas-liquid separator 40 to each other. This configuration ensures the pump side facing surface PS to be more effectively prevented from inclining compared with a configuration where the inclination preventing portion DG and the gasket GKh have different levels of compressibility. The inclination preventing portion DG and the gasket GKh that are the same members not only have the same level of compressibility, but also have the same characteristics including physical change due to temperature change. Thus, the configuration where the inclination preventing portion DG and the gasket GKh are the same members more effectively prevents the pump side facing surface PS from inclining compared with a configuration where the inclination preventing portion DG and the gasket GKh are different members. Furthermore, the inclination preventing portion DG that is the same member as the gasket GKh can be easily prepared, whereby an attempt to lower the manufacturing cost of the fuel cell module 53 can be facilitated. The inclination preventing portion DG according to the present embodiment is the same member as the gasket GKh, and is an annular member with a certain thickness.

The three fastening points B1 to B3 are formed at portions without the separator side pipe 81, the air/water discharge valve 46, and the air/water discharge portion 48. This is because the fastening points B1 to B3 are difficult to form at portions with the separator side pipe 81, the air/water discharge valve 46, and the air/water discharge portion 48. The number of the fastening points B1 to B3, which is three in the present embodiment, may be four or more.

Figure 6:
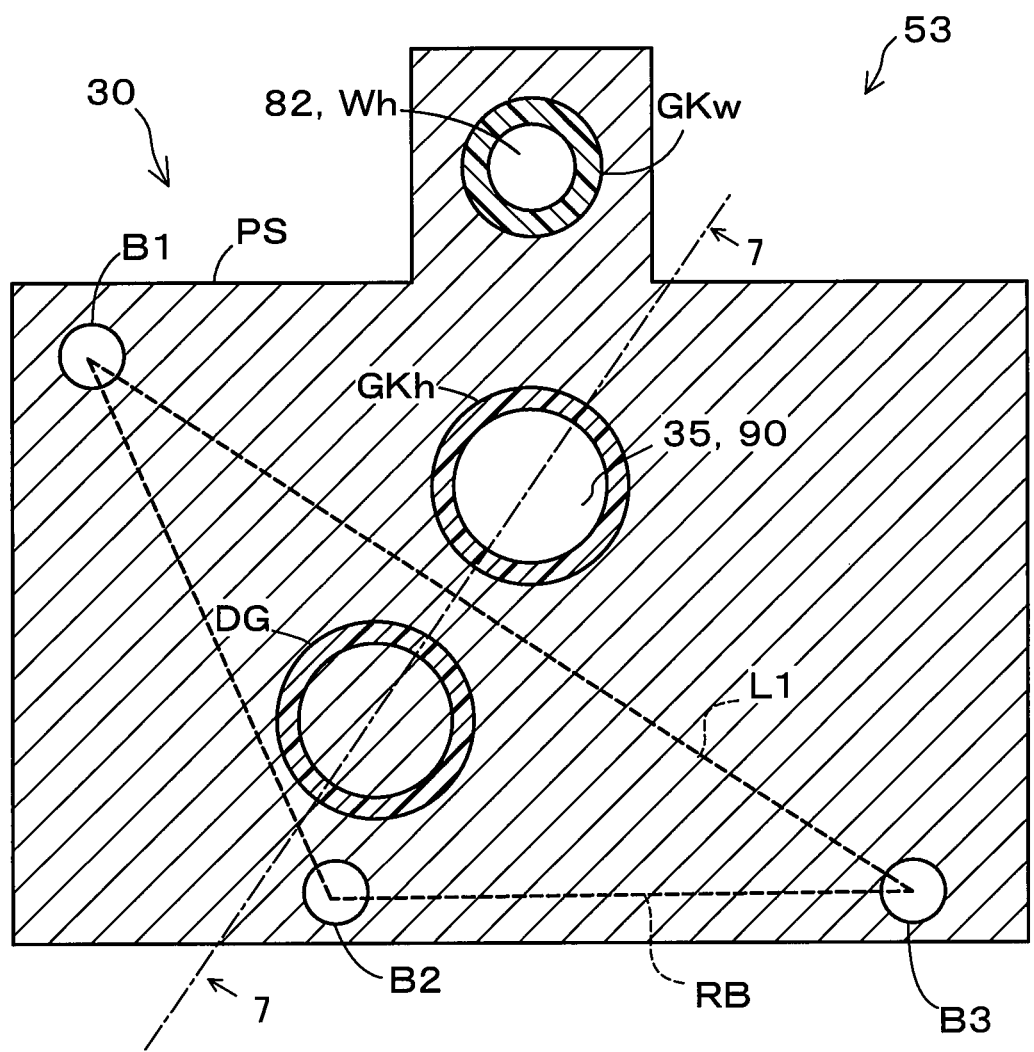
FIG. 6 is a diagram illustrating positional relationship among fastening points, a gasket, and an inclination preventing portion.

FIG. 6 is a diagram illustrating positional relationship among the fastening points B1 to B3, the gasket GKh, and the inclination preventing portion DG. In the present embodiment, the gasket GKh is disposed outside an area RB defined by lines connecting the fastening points B1 to B3. Thus, the area RB is on the inner side of a polygonal shape (triangle in the present embodiment) with the fastening points B1 to B3 serving as apices. The inclination preventing portion DG is within the area RB. The gasket GKh and the inclination preventing portion DG are preferably positioned symmetrically relative to a line L1 that is one of the sides of the area RB. The inclination preventing portion DG with this configuration more effectively reduces unevenness of the reaction produced at the fastening points B1 to B3 due to the repulsive force of the gasket GKh, compared with a configuration where the gasket GKh and the inclination preventing portion DG are asymmetrically positioned relative to the line L1. The line L1 is a line connecting the first fastening point B1 and the third fastening point B3 to each other.

Figure 7:
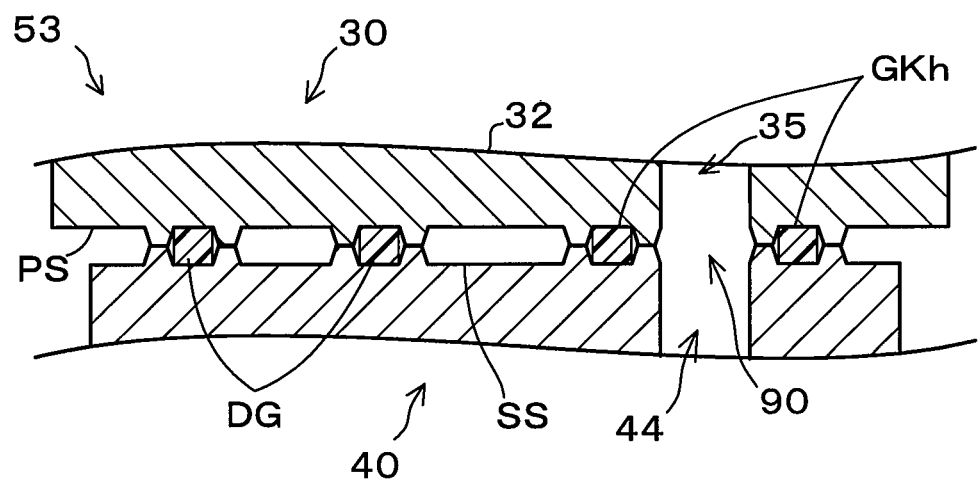
FIG. 7 is a schematic cross-sectional view taken along line 7-7 in FIG. 6.

FIG. 7 is a schematic cross-sectional view taken along line 7-7 in FIG. 6. The fuel cell module 53 includes the inclination preventing portion DG positioned within the area RB defined by the lines connecting the fastening points B1 to B3 to each other (FIG. 6). The inclination preventing portion DG is positioned within the area RB in a compressed and deformed state. Thus, reaction at the fastening points B1 to B3 can also be produced on the inner side of the area RB due to the inclination preventing portion DG. Thus, the inclination preventing portion DG can reduce unevenness of reaction produced at the fastening points B1 to B3 due to the compression and deformation of the gasket GKh positioned outside the area RB. All things considered, inclination of the pump side facing surface PS relative to the separator side facing surface SS is reduced.

Figure 8:
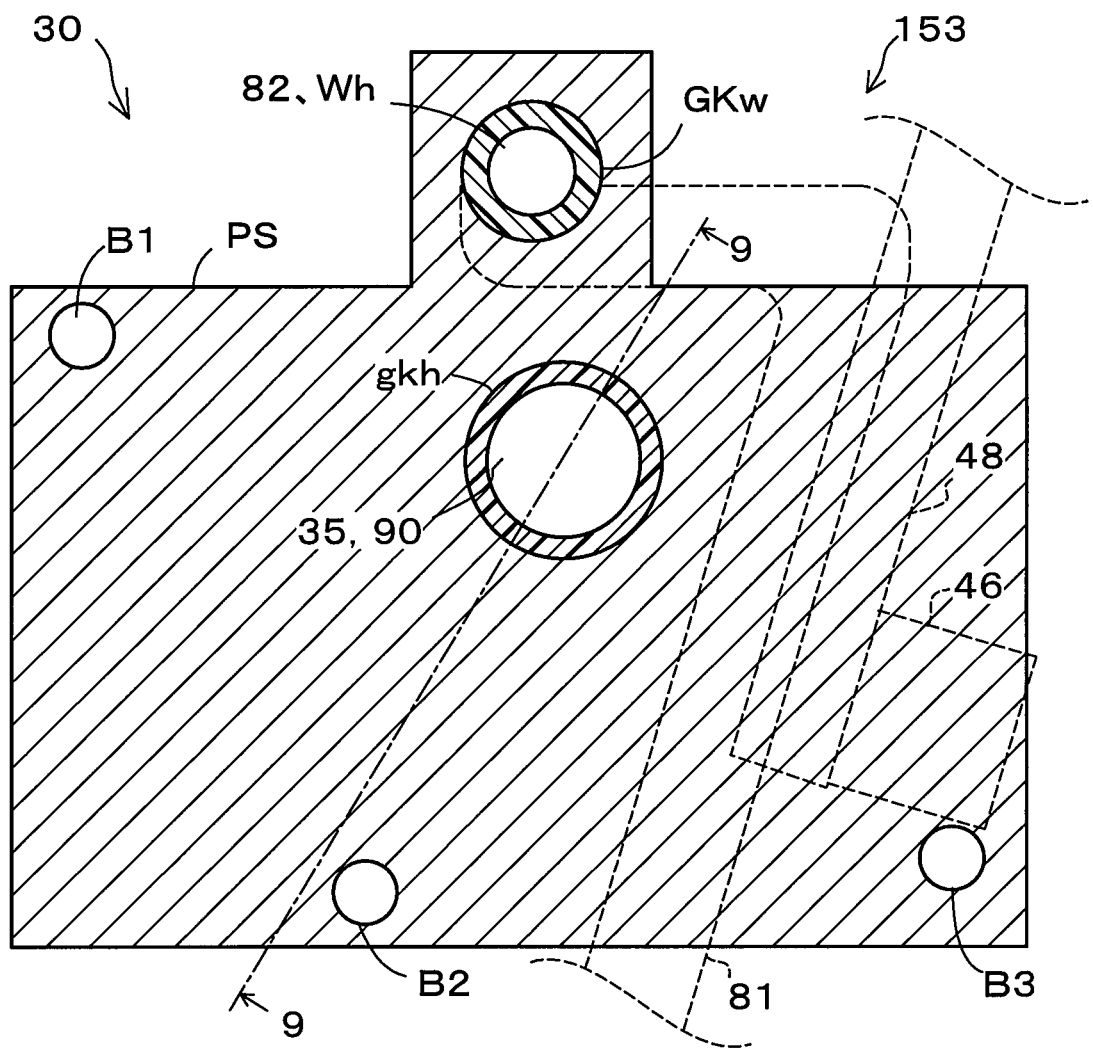
FIG. 8 is a schematic view of a pump side facing surface of a fuel cell module according, to a comparative example.
Figure 9:
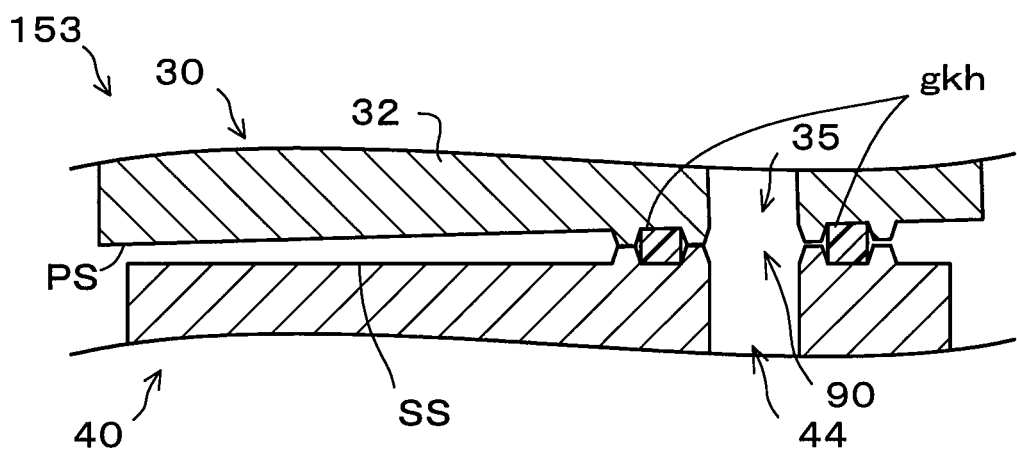
FIG. 9 is a schematic cross-sectional view taken along line 9-9 in FIG. 8.

FIG. 8 is a schematic view of the pump side facing surface PS of a fuel cell module 153 according to a comparative example. FIG. 9 is a schematic cross-sectional view of the fuel cell module 153 according to the comparative example taken along line 9-9. As illustrated in FIG. 8, the fuel cell module 153 according to the comparative example is different from the fuel cell module 53 according to the first embodiment in that the inclination preventing portion is not provided. The other configurations are the same as those in the first embodiment. In the description below, elements that are the same as the counterparts in the first embodiment are denoted with the same reference numerals as in the first embodiment, and the description thereof will be omitted. Without the inclination preventing portion, the reaction produced at the fastening points B1 to B3 due to the repulsive force of a gasket gkh is uneven. The pump side facing surface PS inclines relative to the separator side facing surface SS as illustrated in FIG. 9 due to the unevenness of the reaction produced at the fastening points B1 to B3. The gasket gkh quickly deteriorates when the pump side facing surface PS inclines relative to the separator side facing surface SS.

Figure 10:
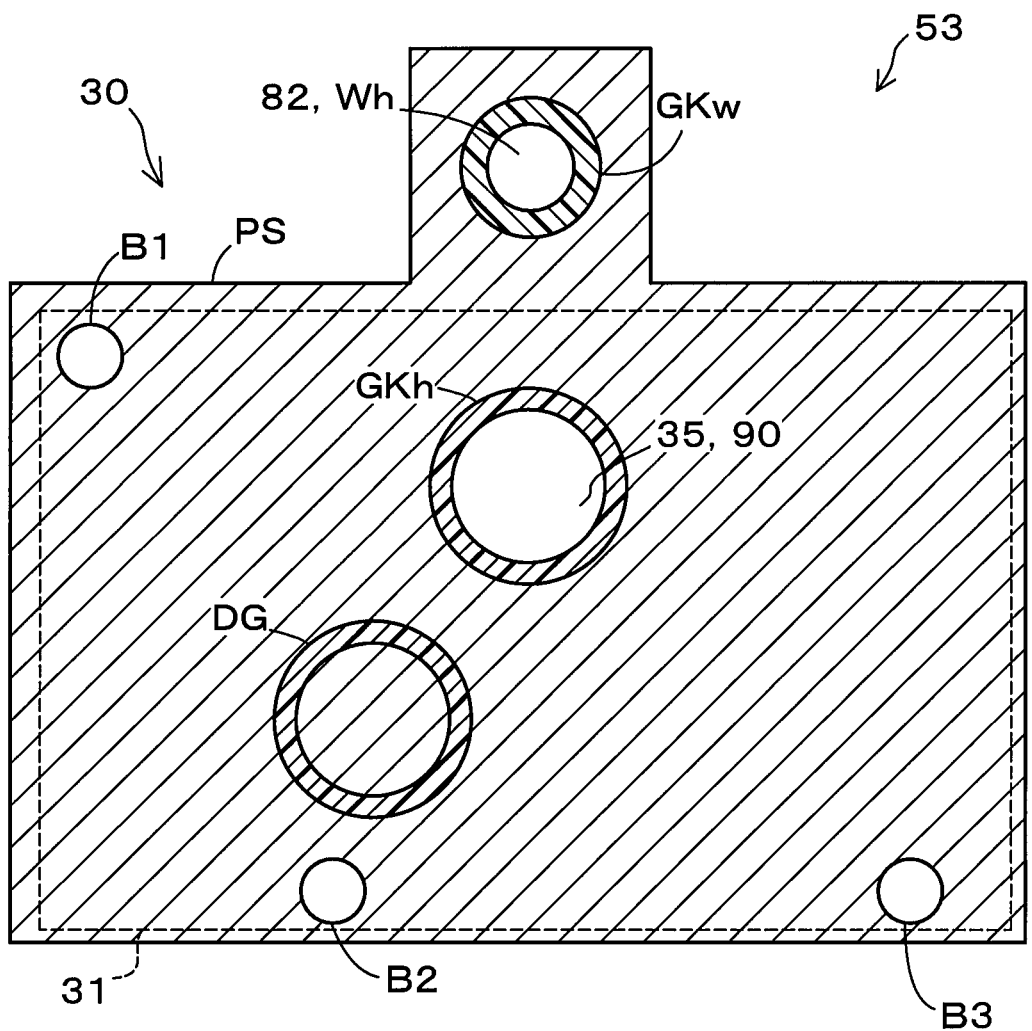
FIG. 10 is a diagram illustrating positional relationship among the fastening points and a main body of a hydrogen pump.

FIG. 10 is a diagram illustrating positional relationship among the fastening points B1 to B3 and the main body 31 of the hydrogen pump 30. In the present embodiment, the fastening points B1 to B3 are positioned more on the inner side than the outer shell of the main body 31 as viewed in a direction orthogonal to the pump side facing surface PS. Thus, the fuel cell module 53 can have a small size in a direction along the pump side facing surface PS. In the present embodiment, the fastening points B1 to B3 are designed to be more on the inner side than the outer shell of the main body 31. However, this should not be construed in a limiting sense. The hydrogen pump 30 and the gas-liquid separator 40 can also be fastened to each other with the fastening points B1 to B3 positioned more on the outer side than the outer shell of the main body 31.

In the fuel cell module 53 according to the first embodiment described above, the inclination preventing portion DG is arranged within the area RB defined by the lines connecting the fastening points B1 to B3 to each other. Thus, unevenness of the reaction produced at the fastening points B1 to B3 due to the repulsive force of the gasket GKh can be reduced. This configuration ensures smaller inclination of the pump side facing surface PS relative to the separator side facing surface SS.

The fastening points B1 to B3 are provided more on the inner side than the outer shell of the main body 31. This configuration ensures a lower risk of the fastening points B1 to B3 directly receiving external force while the fuel cell module 53 is being manufactured and transported, compared with the configuration in which the fastening points B1 to B3 are formed more on the outer side than the outer shell of the main body 31. Thus, the fuel cell module 53 is less likely to be damaged while being manufactured and transported. Furthermore, a smaller size in the direction along the pump side facing surface PS can be achieved compared with the configuration in which the fastening points B1 to B3 are formed more on the outer side than the outer shell of the main body 31.

The configuration that can achieve a smaller size of the fuel cell module 53 in the direction along the pump side facing surface PS ensures a lower risk of a passenger in the fuel cell vehicle 200 getting injured by the fuel cell module 53 colliding with and breaking through the dashboard DB when the fuel cell vehicle 200 makes a head-on collision or the like.

B. Second Embodiment

Figure 11:
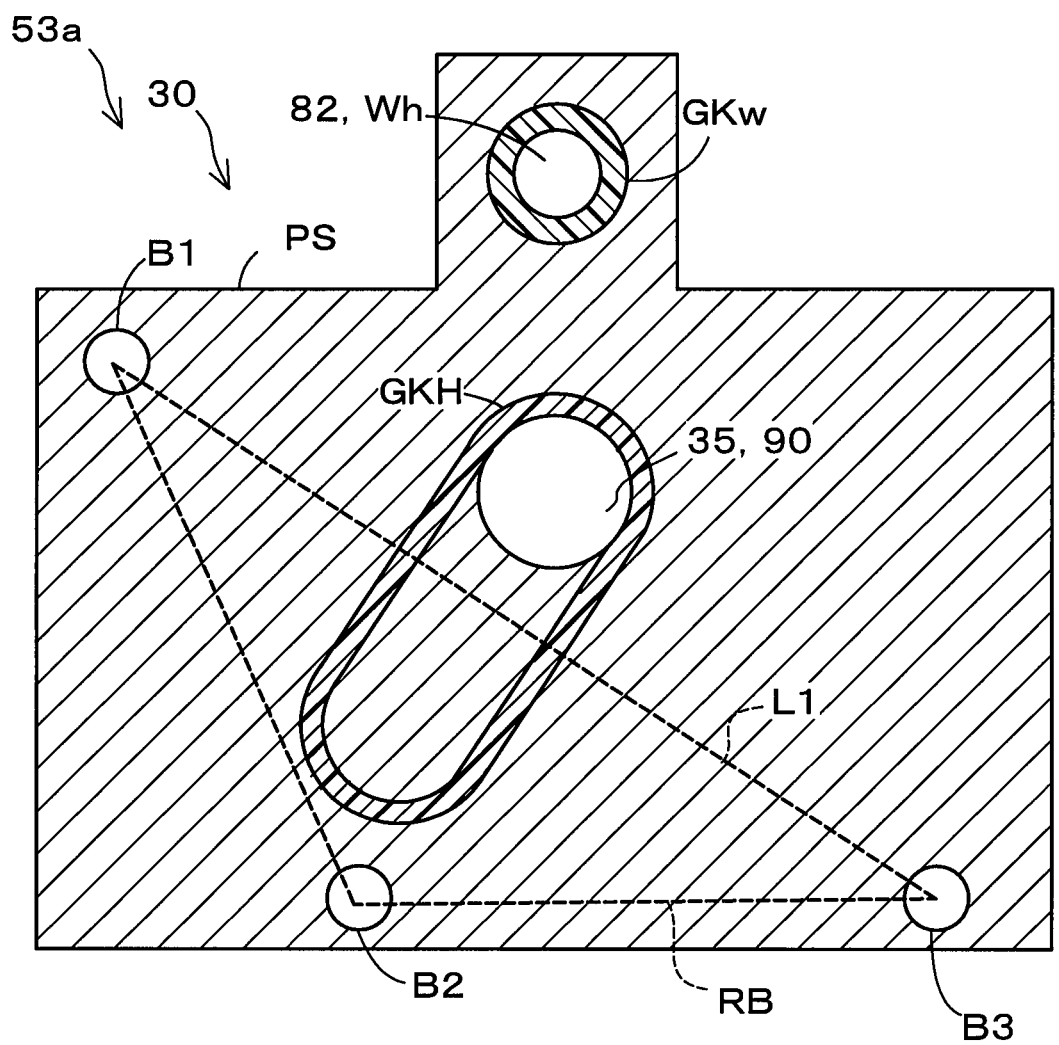
FIG. 11 is a schematic view of a pump side facing surface of a fuel cell module according to a second embodiment.

FIG. 11 is a schematic view of the pump side facing surface PS of a fuel cell module 53a according to a second embodiment. In the description below, elements that are the same as the counterparts in the first embodiment are denoted with the same reference numerals as in the first embodiment, and the description thereof will be omitted. As illustrated in FIG. 11, a gasket GKH has a portion disposed outside the area RB and has a remaining portion disposed inside the area RB. The gasket GKH is disposed over the line L1 to be on both inside and outside of the area RB. The portion of the gasket GKH inside the area RB functions as the inclination preventing portion DG in the first embodiment. Thus, the gasket GKH also serves as the inclination preventing portion DG. This configuration can also prevent the pump side facing surface PS from inclining relative to the separator side facing surface SS, as in the fuel cell module 53 according to the first embodiment.

The present disclosure is not limited to the embodiments described above, and may be implemented in various ways without departing from the gist of the present disclosure. Any of the technical features may be omitted appropriately unless the technical feature is described as essential in the description hereof. The present disclosure may be implemented by aspects described below.

In an aspect of the present disclosure, there is provided a fuel cell module. The fuel cell module comprises: a hydrogen pump that circulates hydrogen offgas in a fuel cell stack and includes a pump side facing surface having a pump side opening through which the hydrogen offgas flows; a gas-liquid separator that is fastened to the hydrogen pump, separates water from the hydrogen gas, and includes a separator side facing surface having a separator side opening through which the hydrogen offgas flows; three or more fastening points at which the hydrogen pump and the gas-liquid separator are fastened to each other with the pump side facing surface and the separator side facing surface facing each other; a heating flow path in which a fluid flows to heat the hydrogen pump and the gas-liquid separator; a gasket that seals a connection portion, at which the pump side opening and the separator side opening are connected to each other, in a flow path through which the hydrogen offgas flows; and an inclination preventing portion formed by an elastic member. At least a part of the gasket is disposed outside an area defined by lines connecting the three or more fastening points to each other, and between the pump side facing surface and the separator side facing surface, and the inclination preventing portion is disposed within the area, and between the pump side facing surface and the separator side facing surface.

In the fuel cell module in the present aspect, at least a part of the gasket is disposed outside an area defined by lines connecting the three or more fastening points to each other, and between the pump side facing surface and the separator side facing surface, and the inclination preventing portion is disposed within the area defined by the lines connecting the three or more fastening points to each other, and between the pump side facing surface and the separator side facing surface. This configuration can reduce unevenness of reaction produced at the fastening points due to repulsive force of the gasket. Thus, inclination of the pump side facing surface relative to the separator side facing surface can be reduced.

In the fuel cell module in the above-described aspect, the inclination preventing portion may be a member that is same as the gasket. In this fuel cell module, the inclination preventing portion is the same member as the gasket, whereby an attempt to lower the manufacturing cost of the fuel cell module can be facilitated.

In the fuel cell module in the above-described aspect, the gasket and the inclination preventing portion may be positioned symmetrical relative to one of the lines defining the area. In this fuel cell module, the gasket and the inclination preventing portion are positioned symmetrical relative to one of the lines defining the area, whereby unevenness of the reaction produced at the fastening points due to the repulsive force of the gasket can be reduced more effectively by the inclination preventing portion.

In the fuel cell module in the above-described aspect, the hydrogen pump may further include a main body accommodating a blade, and the three or more fastening points may be disposed more on an inner side than an outer shell of the main body, in the fuel cell module as viewed in a direction orthogonal to the pump side facing surface. The three or more fastening points are disposed more on an inner side than an outer shell of the main body, in the fuel cell module as viewed in a direction orthogonal to the pump side facing surface, whereby a smaller size of the fuel cell module can be achieved compared with a configuration in which the three or more fastening points are disposed outside the outer shell.

The present disclosure can be implemented in various ways other than the fuel cell module described above, and can be implemented in a fuel cell system including a fuel cell and a fuel cell module, a fuel cell vehicle including the fuel cell system, or the like for example.

What is claimed is:
1. A fuel cell module comprising:
a hydrogen pump that circulates hydrogen offgas in a fuel cell stack and includes a pump side facing surface having a pump side opening through which the hydrogen offgas flows;
a gas-liquid separator that is directly fastened to the hydrogen pump, separates water from the hydrogen gas, and includes a separator side facing surface having a separator side opening through which the hydrogen offgas flows;
three or more fastening points at which the hydrogen pump and the gas-liquid separator are fastened to each other with the pump side facing surface and the separator side facing surface facing each other;
a heating flow path in which a fluid flows to heat the hydrogen pump and the gas-liquid separator;
a gasket that seals a connection portion, at which the pump side opening and the separator side opening are connected to each other, in a flow path through which the hydrogen offgas flows; and
an inclination preventing portion formed by an elastic member, wherein
at least a part of the gasket is disposed outside an area defined by lines connecting the three or more fastening points to each other, and between the pump side facing surface and the separator side facing surface, and the inclination preventing portion is disposed within the area, and between the pump side facing surface and the separator side facing surface.

2. The fuel cell module in accordance with claim 1, wherein the inclination preventing portion is a member that is a same material as the gasket.

3. The fuel cell module in accordance with claim 1, wherein the gasket and the inclination preventing portion are positioned symmetrical relative to one of the lines defining the area.

4. The fuel cell module in accordance with claim 1, wherein the hydrogen pump further includes a main body accommodating a blade, and the three or more fastening points are disposed more on an inner side than an outer shell of the main body, in the fuel cell module as viewed in a direction orthogonal to the pump side facing surface.

* * * * *